Figure 11:
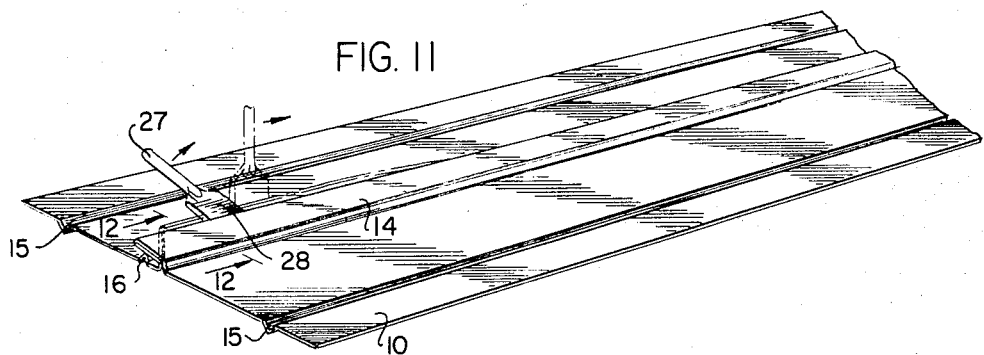

Nov. 14, 1967  A. A. TENNISON, JR  3,352,649
ANTI-SPLASH ROOF VALLEY
Filed Oct. 22, 1965
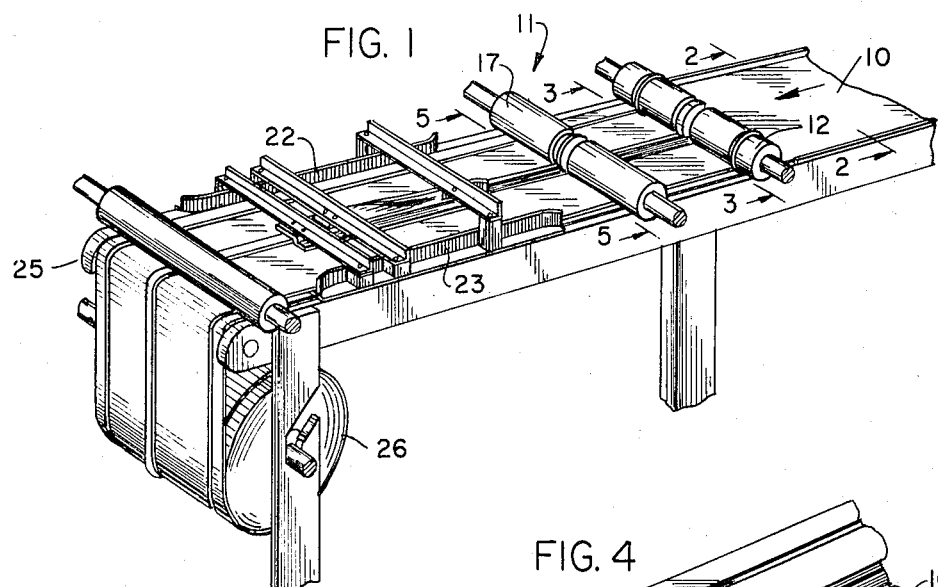
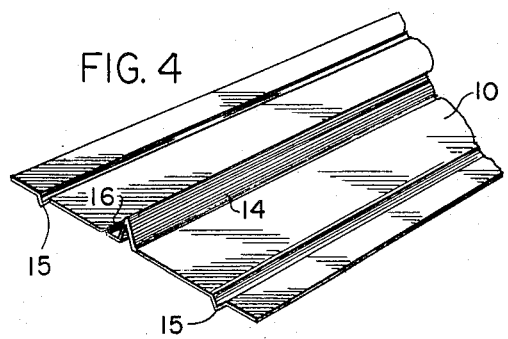
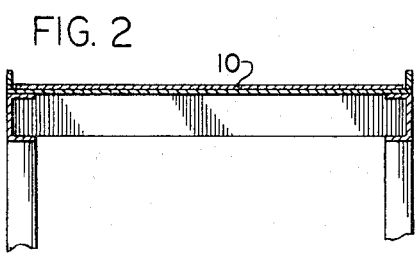
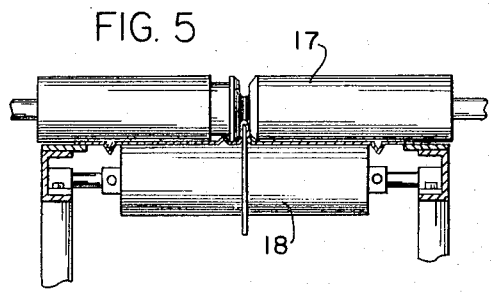
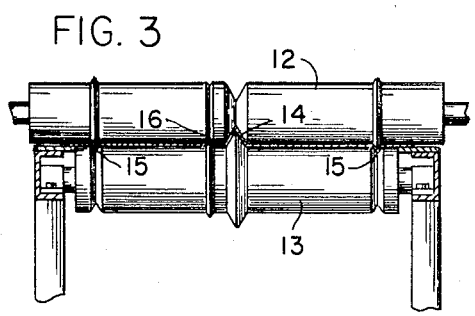
INVENTOR
ALFRED A. TENNISON, JR
BY
ATTORNEYS Nov. 14, 1967  A. A. TENNISON, JR  3,352,649
ANTI-SPLASH ROOF VALLEY
Filed Oct. 22, 1965  4 Sheets-Sheet 2
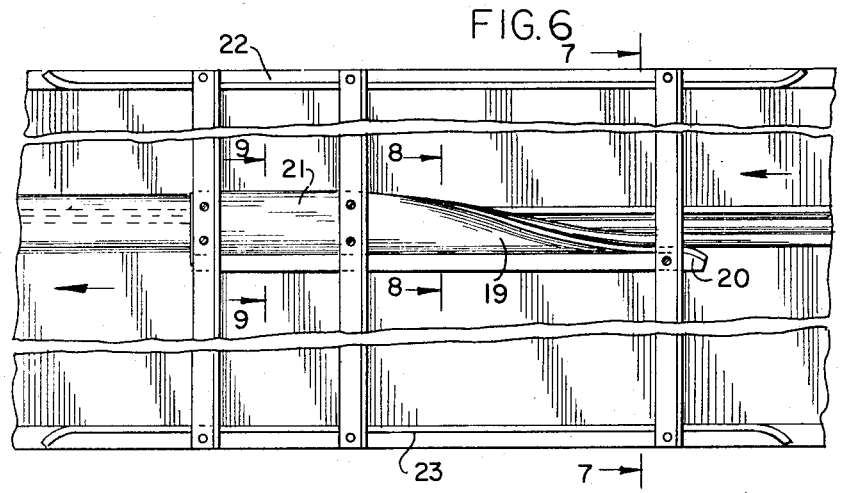
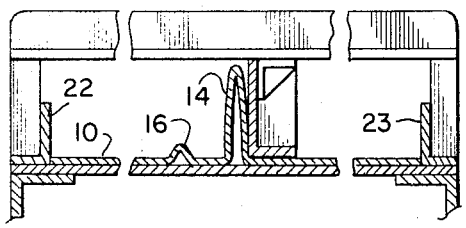
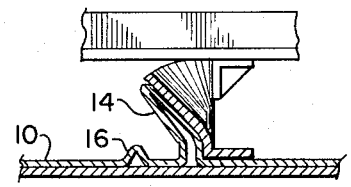
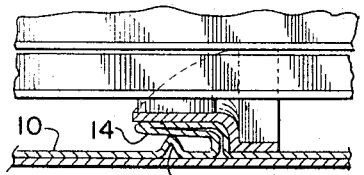
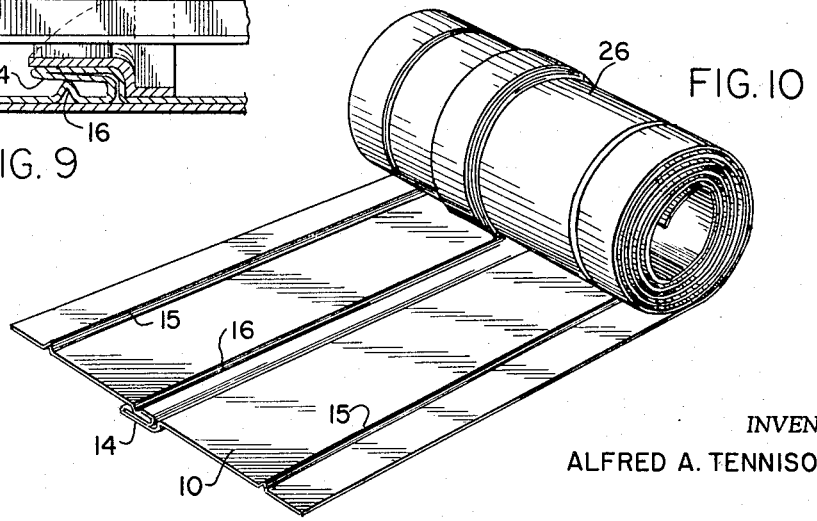
INVENTOR
ALFRED A. TENNISON, JR.
BY
ATTORNEYS

INVENTOR
ALFRED A. TENNISON, JR.

BY
ATTORNEYS

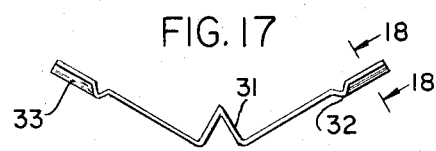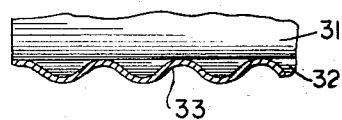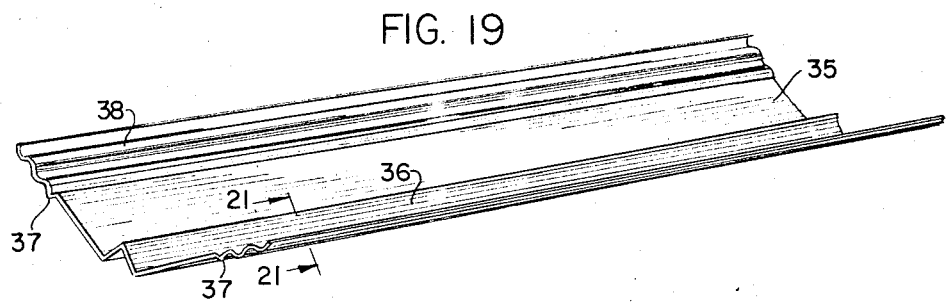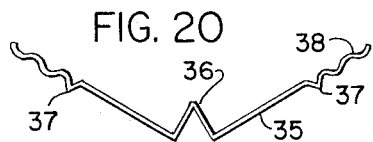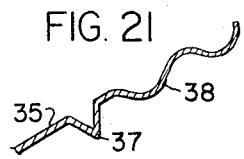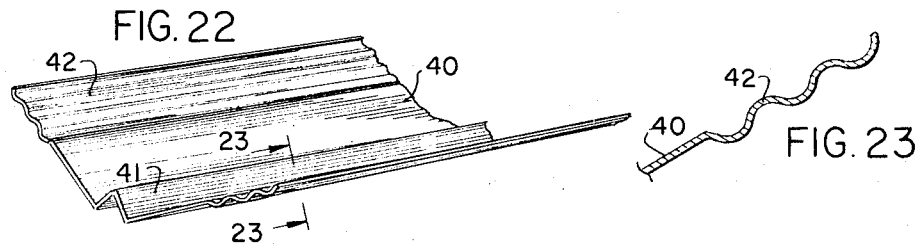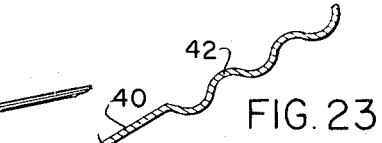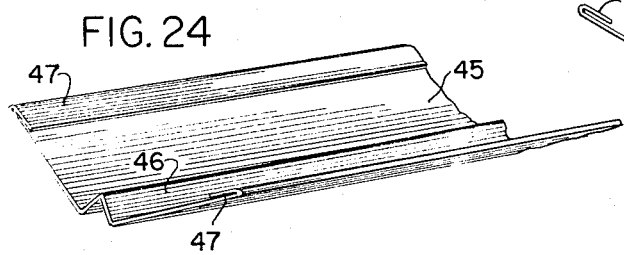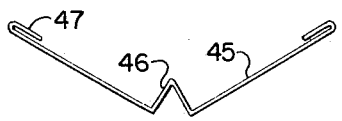

United States Patent Office 3,352,649
Patented Nov. 14, 1967

3,352,649
ANTI-SPLASH ROOF VALLEY
Alfred A. Tennison, Jr., P.O. Box 7,
Texarkana, Tex. 75501
Filed Oct. 22, 1965, Ser. No. 502,072
7 Claims. (Cl. 29—190)

This is a continuation-in-part application of co-pending application Ser. No. 176,754, now Patent No. 3,225,726.

This invention relates to building structures and to apparatus employed in protecting such structures from the natural elements.

The invention relates particularly to the roof structure of buildings and to apparatus such as valleys utilized along the intersection of portions of the roof disposed at an angle to each other.

Heretofore, roof valleys have been provided of various materials and of various configurations which have been used along the intersection of portions of a roof. Some of the valleys have had strengthening corrugations or ridges but substantially all of such valleys have been manufactured in standard lengths which necessitated the joining of two or more sections to produce a valley of the required length, and the utilization of a large amount of space for storing and transporting such lengths.

It is an object of the invention to provide a coiled roof valley having a raised central portion to prevent the splashing of water deposited on the roof by precipitation and to aid in the discharge of such water through the drainage system of the building.

Another object of the invention is to provide a roof valley having a raised central portion and which can be rolled into a continuous coil from which any desired length may be removed, either in a shop or at the construction site.

A further object of the invention is to provide a roof valley having a raised central portion and marginal portions for imparting strength to such valley as well as co-operating with the adjacent roof structure.

Figure 12:
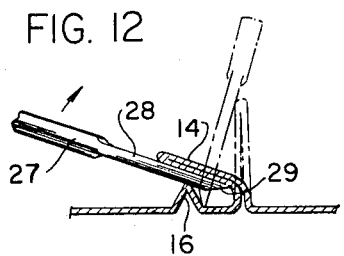
Figure 13:
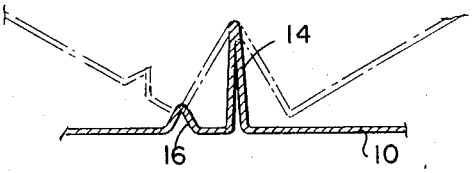
Figure 14:
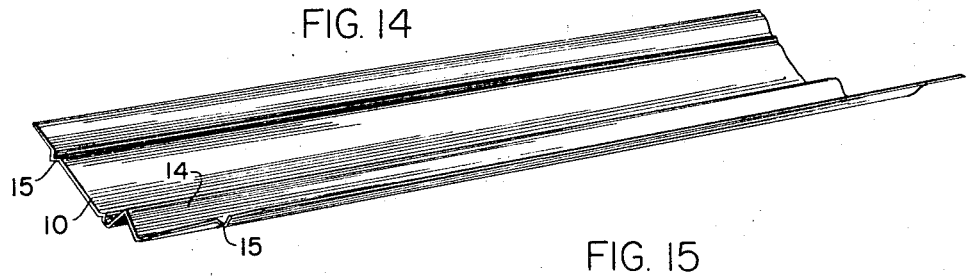
Figure 15:
Figure 16:
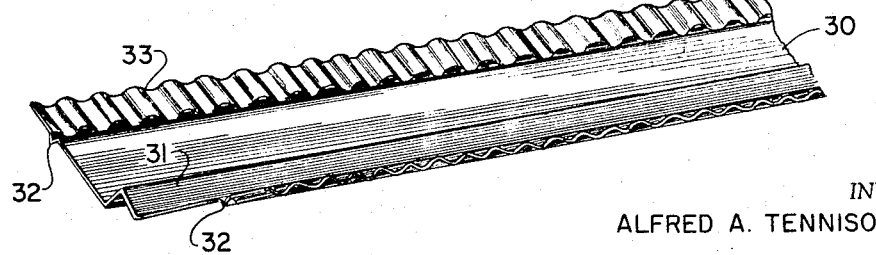

Other objects and advantages of the invention will be apparent from the following description taken in conjunction with the accompanying drawings wherein:

FIG. 1 is a perspective illustrating one method of forming the roof valley of the present invention;

FIG. 2, an enlarged fragmentary section on the line 2—2 of FIG. 1;

FIG. 3, an enlarged fragmentary section on the line 3—3 of FIG. 1;

FIG. 4, a perspective of the roof valley per se;

FIG. 5, an enlarged fragmentary section on the line 5—5 of FIG. 1;

FIG. 6, an enlarged fragmentary top plan of a portion of the structure of FIG. 1;

FIG. 7, an enlarged fragmentary section on the line 7—7 of FIG. 6;

FIG. 8, an enlarged fragmentary section on the line 8—8 of FIG. 6;

FIG. 9, an enlarged fragmentary section on the line 9—9 of FIG. 6;

FIG. 10, a perspective of a coil of roof valley according to the present invention;

FIG. 11, a perspective of the roof valley after it has been separated from the coil;

FIG. 12, an enlarged fragmentary section on the line 12—12 of FIG. 11;

FIG. 13, a section similar to FIG. 12 of the valley of the present invention illustrating the next step in the preparation of such valley;

FIG. 14, a perspective of the completed valley per se;

FIG. 15, an end view of the completed valley;

FIG. 16, a perspective of a modified form of the invention;

FIG. 17, an end view of the modification of FIG. 16;

FIG. 18, an enlarged fragmentary section on the line 18—18 of FIG. 17;

FIG. 19, a perspective of another modification of the invention;

FIG. 20, an end view of the modification of FIG. 19;

FIG. 21, an enlarged fragmentary section on the line 21—21 of FIG. 19;

FIG. 22, a perspective of a further modified form of the invention;

FIG. 23, an enlarged fragmentary section on the line 23—23 of FIG. 22;

FIG. 24, a perspective of a still further modified form of the invention; and,

FIG. 25, an end view of the modification of FIG. 24.

Briefly stated the present invention comprises a sheet metal structural member such as a valley utilized at the point of intersection between angularly disposed roof portions and such valley includes an inverted central V-shaped portion to eliminate splash and a series of outwardly spaced reinforcing channels or corrugations. The central V-shaped portion is adapted to be folded over substantially 90° so that the valley may be rolled into a coil of undetermined length and a required length may be separated from the coil and have the V-shaped portion straightened whereupon the section may be applied to the roof.

With continued reference to the drawings, the present invention comprises a roof valley formed from a continuous strip of malleable sheet metal or other material 10 which may be passed through a crimping machine 11 having forming rollers 12 and 13. Such rollers form ridges in the sheet metal 10 which will strengthen the valley and prevent splashing when the valley is in position on the roof of a building.

As illustrated in FIGS. 1 through 15, the forming rollers 12 and 13 form a relatively large V-shaped portion 14 centrally of the sheet 10 and a pair of smaller V-shaped channels 15 on opposite sides of such strip in spaced relation to the V-shaped portion 14. A small inverted V-shaped ridge 16 is formed closely adjacent to the central inverted V-shaped portions 14 for a purpose which will be described later.

In order to transport the strip of sheet material without the necessity of cutting the same into standard lengths, the material may be rolled into a coil of undertermined length from which sections of any desired length can be cut off as required. In order to accomplish this, it is necessary to fold the large central V-shaped portion to one side to permit the sheet to be formed into a roll. This is done by pressing the V-shaped portion so that contiguous sides are substantially vertical and close together and then folding the central portion to one side.

One way of pressing and folding the central portion is by using crimping rollers 17 and 18 so that the sides of the central portion are substantially vertical and parallel and thereafter passing the sheet metal 10 beneath a cam plate 19 which has a leading edge 20 disposed in a substantially vertical plane relative to such sheet metal. The cam plate 19 is twisted so that the rear edge 21 is disposed substantially 90° from the leading edge 20 and is generally parallel to the plane of the sheet 10. As the sheet passes beneath the cam member 19, the upstanding central portion 14 is bent over by the cam member to a position generally parallel to the sheet 10 as illustrated in FIG. 9. During the twisting process the sheet 10 is prevented from moving sideways by guides 22 and 23 which form a channel of a width equal to the width of the strip of metal after the rolling and crimping process.

After the central portion 14 has been bent over to a horizontal position, the strip passes over feed rollers 25 and is formed into a roll or coil 26 for transporting to a storage depot and subsequently to a point of distribution.

When a strip of metal is to be used as an anti-splash valley on the roof of a building, a predetermined length of material is unrolled from the coil and is severed therefrom. Such length of material then is flattened and the central portion again raised to an upright position in any desired manner as by a tool 27 having a flattened relatively wide head portion 28 with a sharpened edge 29.

As illustrated in FIGS. 11 and 12, the small inverted ridge 16 permits the tool to be lodged beneath the central portion 14 to initiate the raising thereof and then functions as a stop to permit the tool to straighten the central portion to subsantially its original upright position. After the central portion has been moved to a vertical position, the sheet 10 is stretched out to a position shown in phantom in FIG. 13 and in full lines in FIGS. 14 and 15. In this position the strip of material is adapted to be applied to the roof structure of a building with the central portions preventing excessive splashing as well as the longitudinal channels 15 strengthening the material in a longitudinal direction.

As illstrated in FIGS. 16 through 18 a modified form of the roof valley is provided and includes a strip of metal 30 having a central inverted V-shaped portion 31 and a pair of V-shaped channels 32 spaced outwardly from the central portion 31. The portion of the sheet 30 exteriorly of the V-shaped channels 32 is provided with corrugations 33 to strengthen the strip in a transverse direction and to assist the application of transversely corrugated roofing. The V-shaped channels 32 separate the corrugated portions 33 from the flat central section of the sheet so that the flat sections between the channels 32 and the central portion 31 can assist in the flow of water.

With reference to FIGS. 19 through 21 another modification is illustrated in which a strip of sheet material 35 is provided with a central raised portion 36 and a pair of outwardly spaced generally parallel V-shaped channels 37. The portion of the strip exteriorly of the channels 37 is provided with corrugations 48 disposed parallel to the channels 37 to further strengthen the material as well as to be used in conjunction with vertically disposed corrugated roofing. The corrugations 38 are relatively shallow to permit the strip of material to be rolled up into a relatively tight coil for storage and shipping.

With reference to FIGS. 22 and 23 a further modified form of the invention is illustrated in which a strip of sheet material 40 is provided with a central raised portion 41 to aid in the flow of water and to prevent splashing. The outer portions of the strip 40 are provided with longitudinal corrugations 42 similar to the corrugations disclosed in FIGS. 19 through 21 but in which the outwardly spaced channels have been eliminated. In this modification the corrugations 42 strengthen the strip of material in the longitudinal direction and are adapted to join with corrugated roof panels.

With reference to FIGS. 24 and 25 a still further modified form of the invention is illustrated in which a strip of sheet material 45 is provided with a central raised portion 46 and the outer edges of such strip are folded back on themselves to provide a double thickness 47 along the edges to strengthen the edges and prevent warping thereof as well as to prevent water from seeping beneath the roof covering through capillary action.

It will be noted that in all of the modifications the central raised portions may be folded over as disclosed in the first modification during the manufacturing process and subsequently rolled into a coil to assist in the storage and shipping of the material and that predetermined lengths may be severed from the coil and spread apart as previously described for use on the roof of a building.

Although the structure of the present invention has been utilized as a roof valley, it will be apparent that the method and apparatus would be applicable to any structural member having a raised element in use which is depressed to flat position and formed into a coil and later raised for use. Structures of this nature may include standing ridge roofing, ridge coverings, corrugated roofing, and raised ridge siding or the like.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. An anti-splash roof valley for the roof of a building comprising an elongated strip of malleable sheet material, an inverted V-shaped portion located centrally of said strip, an inverted, generally V-shaped rib in said material of lesser height than said portion and substantially paralleling said portion in closely spaced relation thereto, said strip being formed in a coil of undetermined length, said V-shaped portion being bent to a position generally parallel with said strip of material and overlying said rib, whereby a predetermined length of material can be removed from said coil and the V-shaped portion bent to upstanding position with said rib constituting a tool guide and support for bending said portion so that a continuous valley without joints can be applied on said roof.

2. The structure of claim 1 including means adjacent to the outer edges of said strip of material for cooperative engagement with the roof structure.

3. The structure of claim 2 in which said means includes longitudinal channels spaced from and generally parallel to said V-shaped portion.

4. The structure of claim 3 including transverse corrugations located exteriorly of said channels.

5. The structure of claim 3 including longitudinal corrugations located exteriorly of said channels.

6. The structure of claim 2 in which said means includes longitudinal corrugations spaced from and generally parallel to said V-shaped portion.

7. The structure of claim 2 in which said means includes the outer edges of said strip being folded back upon themselves to form a double thickness.

References Cited

UNITED STATES PATENTS

| 607,425 | 7/1898 | Drouve | 52—13 |
| 1,152,236 | 8/1915 | Swanson | 52—13 |
| 2,258,078 | 10/1941 | Tennison | 52—13 |
| 2,553,923 | 5/1951 | Lambert. | |

FOREIGN PATENTS 111,690  12/1928  Austria.

HENRY C. SUTHERLAND, *Primary Examiner.*

M. O. WARNECKE, *Assistant Examiner.*